United States Patent [19]

Takahashi et al.

[11] Patent Number: 4,692,480
[45] Date of Patent: Sep. 8, 1987

[54] THERMOPLASTIC RESIN COMPOSITION

[75] Inventors: Katsuhiko Takahashi, Fuji; Michiyuki Sugita, Shizuoka, both of Japan

[73] Assignee: Polyplastics Co., Ltd., Osaka, Japan

[21] Appl. No.: 850,205

[22] Filed: Apr. 10, 1986

[30] Foreign Application Priority Data

Apr. 12, 1985 [JP] Japan ................... 60-77793

[51] Int. Cl.$^4$ ............... C08K 7/28; C08K 7/24
[52] U.S. Cl. ..................... 523/218; 523/219
[58] Field of Search .................. 523/218, 219

[56] References Cited

U.S. PATENT DOCUMENTS

| | | | |
|---|---|---|---|
| 4,077,922 | 3/1978 | Farrissey et al. | 523/218 |
| 4,085,937 | 4/1978 | Schenk | 523/219 |
| 4,328,320 | 5/1982 | Reszniak et al. | 523/218 |
| 4,330,634 | 5/1982 | Rodaway | 523/218 |
| 4,331,726 | 4/1982 | Cleary | 523/218 |
| 4,485,192 | 11/1984 | Gibbs et al. | 523/219 |
| 4,528,306 | 7/1985 | Shigehiro et al. | 523/219 |
| 4,595,623 | 6/1986 | Du Pont | 523/218 |

OTHER PUBLICATIONS

Titow et al.; Reinforced Thermoplastics; John Wiley & Sons; 1975; pp. 85–87.

Katz et al.; Handbook of Fillers and Reinforcements for Plastics; Van Nostrand Reinhold Co.; 1978; pp. 318, 320, 321.

*Primary Examiner*—Lewis T. Jacobs
*Attorney, Agent, or Firm*—Burns, Doane, Swecker & Mathis

[57] ABSTRACT

A thermoplastic resin composition comprises a thermoplastic resin and a spherical, hollow filler having a wall thickness ratio of 2.5 to 10, defined as a ratio of an outer diameter of the filler to a wall thickness of the filler. It is useful for a light-weighed piece.

9 Claims, No Drawings

THERMOPLASTIC RESIN COMPOSITION

This invention relates to a thermoplastic resin composition which may be used for production of a lightweight molded piece without detriment to the mechanical properties and moldability of the thermoplastic resin. More particularly, the invention relates to a thermoplastic resin composition suitable for use as an exterior material for auto body parts, electrical appliances, OA equipment, and the like.

STATEMENT OF PRIOR ARTS

Thermoplastic resins are widely used in various industrial fields. For the purpose of practical application of such resin for any particular use, it is general practice that different kinds of additives and/or filler materials are incorporated into the resin in order to satisfy the performance requirements of the resin for the use.

Conventionally, glass beads are used as such filler material. Although spherical inorganic filler materials such as glass beads are inferior to fibrous filler materials in respect of tensile strength in a given direction, they can contribute to the improvement of thermoplastic resins in strength and more particularly in rigidity. Furthermore, they are non-anisotropic and this assures good moldability, warpage-free molding, and good configurational stability of moldings. However, glass bead filling involves the problem of excessively increased weight. For weight reduction purposes, therefore, one approach is that "Sirasu" balloon is used instead of glass beads. Another approach is the use of fly ash, made hollow, is incorporated into the resin.

Although filler materials such as "Sirasu" balloon and hollow fly ash are lighter in weight, their own strength is so insufficient that they are likely to be broken under the influence of friction, shear force, and/or injection pressure during melt kneading with resin in an extruder and more particularly under shrinkage pressure in the course of resin hardening in the case where the resin is crystalline. As such, they are not sufficient to serve the purpose of mechanical property improvement for which they are used. Furthermore, they do not contribute in any justifiable way to weight reduction or the provisions of good surface smoothness and moldability.

SUMMARY OF THE INVENTION

Accordingly, the present inventors have directed their research efforts toward developing a thermoplastic resin composition which is satisfactory in strength and rigidity and yet light in weight, and which has good surface smoothness and other excellent performance characteristics such as moldability. Thus, the present inventors have arrived at the present invention.

This invention relates to a thermoplastic resin composition which uses a spherical hollow filler material of a specific configuration to prevent the filler material from being broken under the influence of frictional force, shear force, shrinkage and/or pressure during melt kneading with resin by an extruder or during injection molding operation, and which satisfies requirements such as resin weight reduction, high strength and rigidity, surface smoothness, good moldability, and high configurational accuracy.

Thermoplastic resins useful for the purpose of the invention are not particularly limited, but preferably are organic polymer materials having a partially crystalline structure. These include polyacetal (homopolymer or copolymer), aromatic polyesters consisting of aromatic dicarboxylic acid and diol or oxycarboxylic acid or the like. For example, polyalkylene terephthalates such as polybutylene terephthalate, polypropylene terephthalate, and polyethylene terephthalate, polyamides, and copolymers or mixtures of these have been found to be suitable.

Also available for use are polyethylene, polypropylene, polymers of 1-butene and 2-butene, poly-4-methyl-1-pentene, polyolefins of ethylene and propylene, ethylene and butene, and ethylene and 4-methyl-1-pentene, copolymers consisting principally of polyolefin, ethylene-vinyl acetate copolymer, ethylene-alkyl acrylate copolymer, copolymers of ethylene carboxylate, such as salts of ethylene methacrylate copolymer, and metallic salts thereof, vinyl compounds such as polystyrene, styrene-butadiene-acrylonitrile copolymer, styrene-acrylonitrile copolymer, and methyl methacrylate-styrene copolymer, and copolymers thereof, polycarbonate, polyphenylene oxide, fluoroplastics, and polyvinyl chloride. Needless to say, a mixture of two or more kinds of these high polymer materials may be used.

Spherical hollow filler materials useful for the purpose of the invention are those having a wall thickness ratio of 2.5~10, preferably 3~8, as expressed by the following relation:

$$\text{wall thickness ratio} = \frac{\text{outer diameter of spherical hollow filler material}}{\text{wall thickness of spherical hollow filler material}}$$

Here, the term wall thickness refers to one half of the difference between the outer diameter of the spherical hollow filler material and the inner diameter thereof.

The particle diameter of such filler material is not particularly limited insofar as the configuration of the material permits incorporation thereof into the thermoplastic resin. However, it is desirable that the material have a mean outer particle diameter of less than $500\mu$, preferably, $1\mu \sim 200\mu$.

Spherical hollow filler materials useful for the purpose of the invention are spherical materials composed of silicate, and a preferred filler material is in the form of spherical hollow glass bead.

The required addition of such spherical hollow filler material is 1~60 wt % relative to the composition as a whole. If the addition is less than 1%, no sufficient improvement in strength and rigidity can be obtained. If the addition is more than 60%, other physical properties may be unfavorably affected. A preferred range of addition is 10~40 wt %. As already stated, hollow glass beads have hitherto been used, but are such that the wall is very thin relative to the particle diameter. For example, those beads have a wall thickness of the order of $5\mu$ against the outer particle diameter of about $500\mu$, the wall thickness ratio being approximately 100. In such a case, the glass beads are very likely to be fractured in the course of being mixed with the resin, or during molding operation, which leads to the inconveniences mentioned earlier. The spherical hollow filler material used in the present invention has a small wall thickness ratio. That is, a ratio of the order of 2.5~10. This means a compressive strength of 4000 $kg/cm^2$ or more, which is far much greater than that of aforesaid conventional hollow filler material, i.e., 300 $kg/cm^2$. Therefore, the filler material used in the present invention is comparable to the conventional glass beads with respect of strength, and further it can contribute much toward weight reduction because of its hollow feature.

In the present invention, it is desirable to treat the spherical hollow filler material with a surfacing agent or to add such agent concurrently with the filler material to enhance the compatibility of the filler material with the resin and further improve the mechanical strength of the composition. Among surfacing agents available for the above purpose are various known agents, such as silane-based, epoxy-based, and titanate-based materials.

In order to impart other desired characteristics to the composition of the invention according to the purpose for which the composition is used, it is possible to incorporate into the composition one or more kinds of known additives, such as a lubricant, nucleating agent, releasing agent, antistatic agent, other surface active agent, plasticizer, pigment, dyestuff, heat stabilizer, or ultraviolet stabilizer.

Further, it is possible to add, to such extent that the advantages of the invention will not be adversely affected, one or more kinds of other known reinforcing fillers. For example, fibrous reinforcing fillers including inorganic fibers, such as glass fiber, carbon fiber, graphite fiber, metallic fiber, silicon carbide fiber, asbestos, wollastonite, and fibrous potassium titanate, and organic fibers, such as whisker and the like, lamellar reinforcing fillers, such as micas (muscovite, phlogopite, secicite, etc.), lamellar glass (glass flake), talc, and metallic foil, and particulate additives, such as calcium carbonate, quartz powder, silica, magnesium carbonate, calcium sulfate, clay, diatomaceous earth, alumina, silica sand, glass powder, metal particle, and graphite may be used.

It is also possible to mix or copolymerize one or more kinds of organic polymer materials in order to impart further desired characteristics to the composition of the invention. Examples of such materials are rubber-like polymer materials, such as low molecular-weight polyethylene, polyurethane, and butyl rubber, polyphase copolymers consisting of polyacrylate resins, and thermoplastic segment-type copolyesters (copolymers thereof include graft copolymers). In order to improve the impact strength in particular, polyphase copolymers consisting of polyacrylate resins, and thermoplastic segment-type copolyesters are preferred.

The composition of the present invention can be easily prepared in accordance with any known method employed in preparing conventional resin compositions. For example, one method is such that individual components are mixed and the mixture is kneaded and extruded into pellets by employing an extruder, the pellets being subsequently molded. Another method is such that pellets of different compositions are first prepared and the pellets are mixed in specified proportions, the mixture being then subjected to molding so that a molded piece of the desired composition is obtained. Still another method is that one or more of the components are directly charged into the molding machine. Any of these methods may be equally used suitable for preparing the composition of the present invention.

As above described, the composition of the invention incorporates a spherical hollow filler material, and therefore, permits production of a lighter-weight molded piece than in the case where an internally filled spherical filler material is used. The composition of the present invention also provides an economical advantage because of its reduced weight per unit volume.

Furthermore, unlike hollow filler materials having a large wall thickness ratio which have been conventionally used, the spherical hollow filler material incorporated in the composition of the present invention is not liable to breakage during extrusion or molding. Accordingly, the composition of the present invention provides great advantages in surface smoothness, moldability, and dimensional and configurational accuracy of molded products. In addition it is possible to incorporate into the composition those physical and mechanical properties which are seen with conventional spherical filler materials of the internally filled type.

Therefore, the composition of the present invention is suitable for use in various areas of application where lightness in weight and good physical characteristics are particularly required, such as auto body parts, and exterior members parts of electrical appliances and OA equipment.

The invention will be illustrated in further detail by the following examples and comparative examples. It is to be understood, however, that the invention is not limited by the examples.

EXAMPLES 1~5; COMPARATIVE EXAMPLES 1~5

To a polybutylene terephthalate resin having an inherent viscosity of 1.0 was added one of three kinds of spherical hollow glass filler materials having wall thickness ratios of 2.8 (mean outer particle diameter, 1.3μ), 5.5 (mean outer particle diameter, 3.0μ), and 7.0 (mean outer particle diameter, 1.8μ) respectively, in such proportion as shown for each example in Table 1, and the mixture was kneaded and extruded into pellets by employing an extruder. Subsequently, the pellets were molded into test pieces by employing an injection molding machine and under an injection pressure of 1,000 kg/cm$^2$. Evaluation was made of the test pieces as to specific gravity and filler breakage. The results of the evaluation tests are shown in Table 1.

Similarly, evaluation was made of test pieces prepared by using glass microballoon, "Sirasu" balloon, and internally filled glass beads, instead of the spherical hollow glass filler materials, and the results of the evaluation, as comparative examples, are also shown in Table 1.

Methods of measurement employed in the evaluation tests are as follows:

Specific gravity: Measurement was made in accordance with ASTM-D792.

Filler breakage:

By employing an electron microscope, the number of broken particles was counted of each 100 particles seen on the surface of each test piece, breakage being determined from such number.

TABLE 1

| | Example 1 | Example 2 | Example 3 | Example 4 | Comp. Example 1 | Comp. Example 2 | Comp. Example 3 | Comp. Example 4 | Example 5 | Comp. Example 5 |
| --- | --- | --- | --- | --- | --- | --- | --- | --- | --- | --- |
| Composition (wt %) | | | | | | | | | | |
| Polybutylene terephthalate | 60 | 60 | 90 | 90 | 60 | 60 | 90 | 90 | 66.4 | 60 |

TABLE 1-continued

|  | Example 1 | Example 2 | Example 3 | Example 4 | Comp. Example 1 | Comp. Example 2 | Comp. Example 3 | Comp. Example 4 | Example 5 | Comp. Example 5 |
|---|---|---|---|---|---|---|---|---|---|---|
| Spherical hollow glass filler *1 | 40 | — | 10 | — | — | — | — | — | — | — |
| Spherical hollow glass filler *2 | — | 40 | — | 10 | — | — | — | — | — | — |
| Spherical hollow glass filler *3 | — | — | — | — | — | — | — | — | 33.6 | — |
| Glass microballoon *4 | — | — | — | — | 40 | — | 10 | — | — | — |
| "Sirasu" balloon *5 | — | — | — | — | — | 40 | — | 10 | — | — |
| Glass bead (internally filled) *6 | — | — | — | — | — | — | — | — | — | 40 |
| Specific gravity | 1.54 | 1.46 | 1.36 | 1.34 | 1.64 | 1.63 | 1.40 | 1.39 | 1.42 | 1.62 |
| Breakage (%) | 0 | 0 | 0 | 0 | 96 | 94 | 95 | 92 | 0 | 0 |

*1 Mean outer particle diameter 1.3μ; wall thickness ratio 2.8.
*2 Mean outer particle diameter 3.0μ; wall thickness ratio 5.5.
*3 Mean outer particle diameter 1.8μ; wall thickness ratio 7.0.
*4 Mean outer particle diameter 100μ; wall thickness ratio 50.
*5 Mean outer particle diameter 150μ; wall thickness ratio 37.5.
*6 Mean outer particle diameter 60μ.

EXAMPLE 6; COMPARATIVE EXAMPLES 6 AND 7

To a polybutylene terephthalate resin having an inherent viscosity of 0.8 was added a spherical hollow glass filler material having a wall thickness ratio of 3.0 (mean outer particle diameter of 17μ) in such proportion as shown in Table 2, and the mixture was pelletized in same manner as in Example 1. Test pieces were prepared under different injection pressure conditions and were tested for evaluation in same manner as in Example 1. Evaluation as to bending strength and modulus in flexture was made in accordance with ASTM-D790. The results are shown in Table 2.

TABLE 2

|  |  | Example 6 | Comp. Example 6 | Comp. Example 7 |
|---|---|---|---|---|
| Composition (wt %) |  |  |  |  |
| Polyethylene terephthalate |  | 50.0 | 50.0 | 50.0 |
| Spherical hollow glass filler |  | 50.0 | — | — |
| "Sirasu" balloon *2 |  | — | 50.0 | — |
| Fly ash |  | — | — | 50.0 |
| Breakage of filler in molded piece | Specific injection pressure 700 kg/cm² | 0 | 90 | 85 |
|  | Specific injection pressure 1000 kg/cm² | 0 | 95 | 91 |
| Physical property *1 | Bending strength (kg/cm²) | 980 | 700 | 850 |
|  | Modulus in flexture (kg/cm²) | 54,000 | 36,000 | 48,000 |
|  | Specific gravity | 1.58 | 1.68 | 1.66 |

*1 Values based on evaluation of the respective test pieces molded under a specific injection pressure of 1000 kg/cm².
*2 Mean outer particle diameter 150μ; wall thickness ratio 37.5!
*3 Mean outer particle diameter 50μ; wall thickness ratio 17.

EXAMPLE 7; COMPARATIVE EXAMPLE 8

To a polybutylene terephthalate resin having an inherent viscosity of 0.8 was added a spherical hollow glass filler material having a wall thickness ratio of 7.0 (mean outer particle diameter 1.8μ) or an internally filled glass bead (the two being of same configuration as those used in Example 5 and Comparative Example 5 respectively), together with glass fiber, in such proportions as shown in Table 3. Evaluation in physical properties was made in same manner as in Example 1 and Comparative Example 6. The results are shown in Table 3.

TABLE 3

|  |  | Example 7 | Comp. Example 8 |
|---|---|---|---|
| Polybutylene terephthalate |  | 70.0 | 70.0 |
| Spherical hollow glass filler |  | 15.0 | — |
| Internally filled glass bead |  | — | 15.0 |
| Glass fiber |  | 15.0 | 15.0 |
| Tensile strength (kg/cm²) | ASTM D-638 | 1010 | 1005 |
| Tensile elongation (%) | D-638 | 2.5 | 2.6 |
| Izod impact strength D-256 (kg/cm · cm) |  |  |  |
| Notched side |  | 5.5 | 5.4 |
| Opposite-to-notched side |  | 25.2 | 26.4 |
| Modulus in flexture D-790 (kg/cm²) |  | 62,000 | 63,000 |
| Specific gravity |  | 1.47 | 1.52 |

EXAMPLES 8~11; COMPARATIVE EXAMPLES 9~12

To a polyacetal copolymer was added one of two kinds of spherical hollow glass filler material having wall thickness ratios of 5.5 (mean outer particle diameter of 3.0μ) and 4.0 (mean outer particle diameter of 50μ) respectively, in such proportion as shown in Table 4, and test pieces were prepared in same manner as in Example 1 and evaluated in respect of specific gravity and filler breakage. The results are shown in Table 4.

TABLE 4

|  | Example 8 | Example 9 | Example 10 | Example 11 | Comp. Example 9 | Comp. Example 10 | Comp. Example 11 | Comp. Example 12 |
| --- | --- | --- | --- | --- | --- | --- | --- | --- |
| Composition (wt %) | | | | | | | | |
| Polyacetal | 50 | 50 | 80 | 80 | 50 | 50 | 50 | 80 |
| Spherical hollow glass filler *1 | 50 | — | 20 | — | — | — | — | — |
| Spherical hollow glass filler *2 | — | 50 | — | 20 | — | — | — | — |
| Glass microballoon *3 | — | — | — | — | 50 | — | — | 20 |
| "Sirasu" balloon *4 | — | — | — | — | — | 50 | — | — |
| Glass beads (internally filled) *5 | — | — | — | — | — | — | 50 | — |
| Specific gravity | 1.65 | 1.58 | 1.50 | 1.47 | 1.72 | 1.68 | 1.80 | 1.52 |
| Breakage (%) | 0 | 0 | 0 | 0 | 96 | 93 | 0 | 92 |

*1 Mean outer particle diameter 3.0μ; wall thickness ratio 5.5.
*2 Mean outer particle diameter 50μ; wall thickness ratio 4.0.
*3 Mean outer particle diameter 100μ; wall thickness ratio 50.
*4 Mean outer particle diameter 150μ; wall thickness ratio 37.5.
*5 Mean outer particle diameter 60μ.

The embodiments of the invention in which an exclusive property or privilege is claimed are defined as follows:

1. A thermoplastic resin composition which comprises a thermoplastic resin and a spherical, hollow filler wherein said filler has a wall thickness ratio of about 2.5 to about 10, said ratio defined by the ratio of the outer diameter of the filler to the wall thickness of the filler.

2. A composition as claimed in claim 1, which comprises 40 to 99 percent by weight of the thermoplastic resin and 1 to 60 percent by weight of the filler.

3. A composition as claimed in claim 1, in which said filler has a size of 500 microns or smaller on the average.

4. A composition as claimed in claim 1, in which said filler is made of glass beads.

5. A composition as claimed in claim 4, in which said glass beads have a compressive strength of 4,000 kg/cm$^2$ or larger.

6. A composition as claimed in claim 1, which further comprises a silane compound, an epoxy compound or a titanate compound.

7. A composition as claimed in claim 1, in which said thermoplastic resin is selected from polyacetal, polyester, polyamide, polyethylene, polypropylene, polybutene, poly-methylpentene, copolymers of olefines, polystyrene, copolymers of styrene, polycarbonate, polyphenylene oxide, fluororesin and polyvinyl chloride.

8. A composition as claimed in claim 1, in which said thermoplastic resin is polyester or polyacetal.

9. A composition as claimed in claim 1, in which said ratio ranges from 3 to 8.

* * * * *